(12) United States Patent
Miyata

(10) Patent No.: US 8,279,473 B2
(45) Date of Patent: Oct. 2, 2012

(54) IMAGE PROCESSING SYSTEM, PRINTER DRIVER, SCANNER DRIVER, PRINTING DEVICE AND READING DEVICE

(75) Inventor: Yuji Miyata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 638 days.

(21) Appl. No.: 12/408,079

(22) Filed: Mar. 20, 2009

(65) Prior Publication Data

US 2009/0268237 A1 Oct. 29, 2009

(30) Foreign Application Priority Data

Apr. 25, 2008 (JP) ................... 2008-115671

(51) Int. Cl.
*G06F 3/12* (2006.01)
*B41J 5/30* (2006.01)
(52) U.S. Cl. .................. 358/1.15; 358/1.13; 400/62
(58) Field of Classification Search .............. 358/1.15, 358/1.13; 400/62
See application file for complete search history.

(56) References Cited

U.S. PATENT DOCUMENTS

2004/0125395 A1* 7/2004 Onishi ............... 358/1.13

FOREIGN PATENT DOCUMENTS

| JP | 10-115962 | 5/1998 |
|---|---|---|
| JP | 10-222328 | 8/1998 |
| JP | 2000-221749 | 8/2000 |
| JP | 2003-107842 | 4/2003 |
| JP | 2003-223033 | 8/2003 |
| JP | 2004-199292 A | 7/2004 |
| JP | 2005-186335 A | 7/2005 |
| JP | 2006-091141 | 4/2006 |

OTHER PUBLICATIONS

JP Office Action dtd Apr. 15, 2010, JP Appln. 2008-115671, partial English translation.

* cited by examiner

*Primary Examiner* — Charlotte M Baker
*Assistant Examiner* — Rury Grisham
(74) *Attorney, Agent, or Firm* — Banner & Witcoff, Ltd.

(57) ABSTRACT

An image processing system, a computer readable medium, a printing device and a reading device are provided. The image processing system includes an operation unit which receives commands; a setting unit which performs setting processing for setting, in accordance with the commands received by the operation unit, a performance condition including an independent setting item, the independent setting item comprising first and second fields for setting different values, respectively, for the front side and the back side of a sheet material; and a performance unit which processes the front side and the back side of the sheet material in accordance with the performance condition set by the setting unit. The printing device includes a print unit that performs double-sided printing on a sheet material; the operation unit; the setting unit; and a control unit that controls the print unit to perform double-sided printing in accordance with the print condition.

13 Claims, 13 Drawing Sheets

IMAGE PROCESSING SYSTEM, PRINTER DRIVER, SCANNER DRIVER, PRINTING DEVICE AND READING DEVICE

CROSS-REFERENCE TO RELATED APPLICATION

This application claims priority from Japanese Patent Application No. 2008-115671, filed on Apr. 25, 2008, the entire subject matter of which is incorporated herein by reference.

TECHNICAL FIELD

Systems, devices, and computer readable media consistent with the present invention relate to reading and printing of double-sided media.

BACKGROUND

Printing devices, such as a printer having a double-sided print function and a multifunction machine, have hitherto been known. When printing is performed by such a printing device, a user specifies various print conditions by way of; for instance, a computer, and commands printing. Then, a printer driver generates print data in accordance with the specified print conditions; the print data are supplied to the printing device; and printing is performed. Print conditions include items; for instance, color/monochrome (and/or a number of colors), a resolution, an enlargement/reduction ratio, and the like. At the time of double-sided printing, the front side and the back side of a recording medium are printed using the same print conditions.

Additionally, a printing device having a function of reading both the front side and the back side of an original to acquire image data is also known. When double-sided reading is performed by such a reader, the user specifies various read conditions, and the front side and the back side of the original are read using the same read conditions (see JP-A-10-222328)

SUMMARY

Illustrative aspects of the present invention seek to enhance the convenience when double-sided printing or double-sided reading is performed.

According to an illustrative aspect of the present invention, there is provided an image processing system comprising: an operation unit which receives commands; a setting unit which performs setting processing for setting, in accordance with commands received the operation unit, a performance condition comprising an independent setting item, the independent setting item comprising a first field and a second field for setting different values, respectively, for the front side and the back side of a sheet material; and a performance unit which performs printing or reading the front side and the back side of the sheet material in accordance with the performance condition set by the setting unit.

According to another illustrative aspect of the present invention, there is provided a computer readable medium storing a printer driver for configuring a printing device, the printer driver comprising an acquisition module and a print module. The acquisition module acquiring a value of a print condition comprising an independent setting item that enables independent setting of different values respectively for the front side and the back side of a sheet material. The print module generating print data for causing the printing device to perform double-sided printing in accordance with the set value of the print condition.

According to another illustrative aspect of the present invention, there is provided a computer readable medium storing a scanner driver for configuring an information processing device, the scanner driver comprising an acquisition module and a scan module. The acquisition module acquiring a value of a read condition comprising an independent setting item that enables independent setting of different values respectively for the front side and the back side of a sheet material. The scan module generating a read command for causing the reading device to read the front side and the back side of the sheet material in accordance with the acquired value of the read condition.

According to another illustrative aspect of the present invention, there is provided a printing device comprising: a print unit that performs double-sided printing on a sheet material; an operation unit that receives commands; a setting unit that performs, in accordance with a command input to the operation unit, processing for setting a print condition comprising an independent setting item, the independent setting item comprising a first field and a second field for setting different values, respectively, for the front side and the back side of a sheet material; and a control unit that controls the print unit to perform double-sided printing in accordance with the print condition set by the setting unit.

According to another illustrative aspect of the present invention, there is provided a reading device comprising: a read unit that acquires image data by reading front and back sides of a sheet material; an operation unit that receives a command; a setting unit that performs, in accordance with a command input to the operation unit, processing for setting the read condition comprising an independent setting item, the independent setting item comprising a first field and a second field for setting different values, respectively, for the front side and the back side of a sheet material; and a control unit that controls the read unit to read the front and back sides of a sheet material in accordance with the read condition set by the setting unit.

According to the above configuration, conditions for performing printing or reading operation include an independent setting item that enables setting of different set values respectively for the front side and the back side, and printing or reading can be performed in accordance with performance conditions set respectively for the front side and the back side of a sheet, and hence convenience is enhanced. Moreover, as compared with a case where printing or reading is separately performed by changing the performance conditions for each side, operation can be readily performed.

DETAILED DESCRIPTION

First Exemplary Embodiment

A first exemplary embodiment of the present invention will now be described by reference to FIGS. 1 through 6.

(Electrical Configuration of a Print System)

Figure 1:
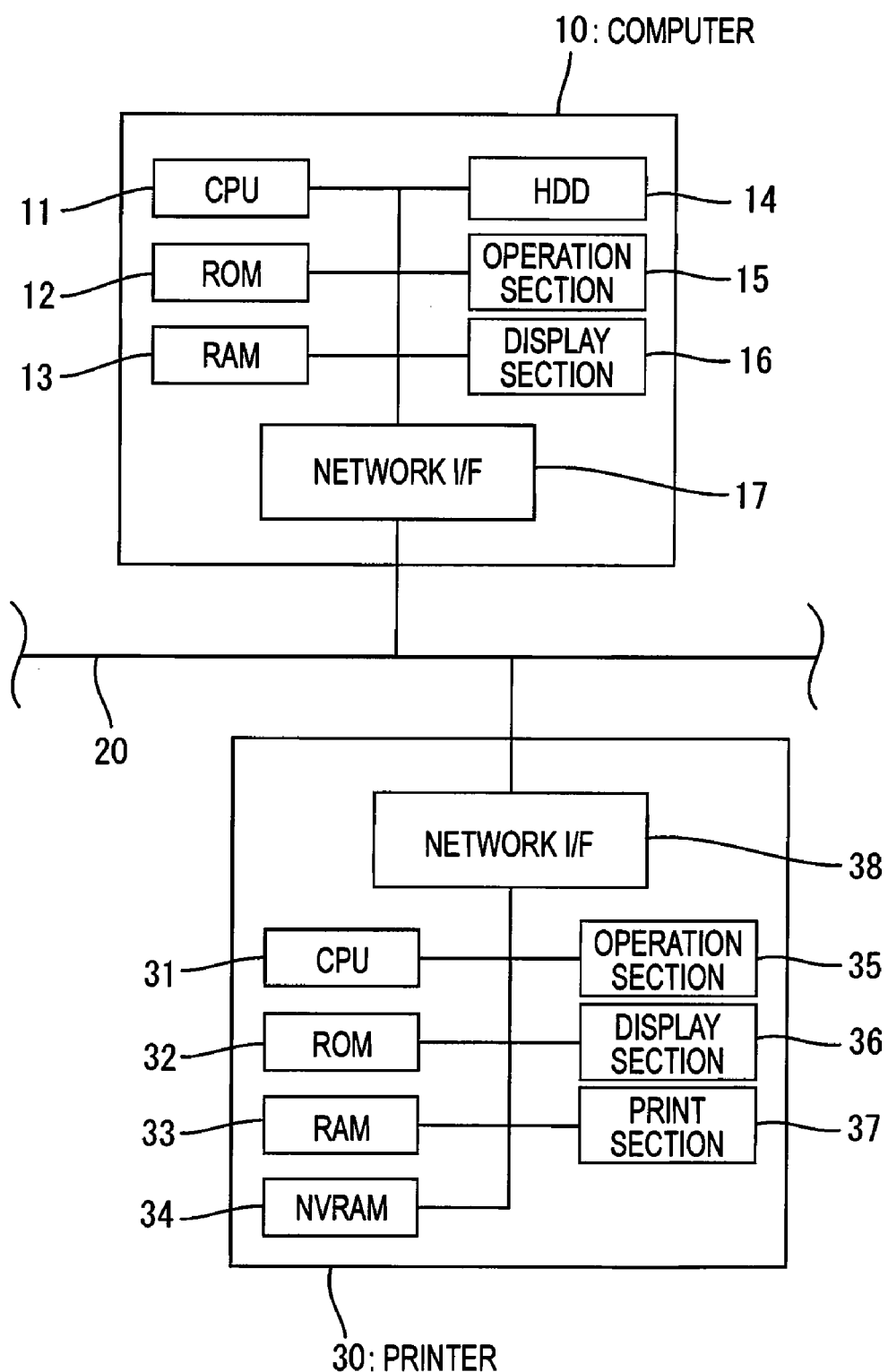
FIG. 1 is a block diagram showing an example of an electrical configuration of a print system according to a first exemplary embodiment of the present invention.

FIG. 1 is a block diagram showing an example of an electrical configuration of a print system. The print system includes a computer 10 (an example of an information processing device) and a printer 30 (an example of an execution unit and an example of a printing device).

The computer 10 comprises a Central Processing Unit (CPU) 11 (an example of a setting unit); a Read Only Memory (ROM) 12; a Random Access Memory (RAM) 13; a hard disk drive 14; an operation section 15 (an example of an operation unit) having a keyboard or a mouse, a pointing device, and the like; a display section 16 (an example of a display unit) having a liquid-crystal display, and the like; a network interface 17 coupled to a communication line 20; and others. Various programs, such as an Operating System (OS), application software that enables the generation of print data, a printer driver for controlling the printer 30, and the like, are stored in the hard disk drive 14.

The printer 30 (an example of a performance unit) comprises a CPU 31, ROM 32, RAM 33, Nonvolatile Random Access Memory (NVRAM) 34, an operation section 35, a display section 36, a print section 37, a network interface 38, and the like. Various programs for controlling operation of the printer 30 are stored in the ROM 32. In accordance with a program read from the ROM 32, the CPU 31 controls operation of the printer 30 while storing processing results into the RAM 33 and the NVRAM 34.

The operation section 35 has a plurality of buttons and enables various input operations to be received, such as inputting a command for starting to print. The display section 36 has a liquid-crystal display, a lamp, and the like; and can display various setting screens, an operating state of the printer 30, and the like. The print section 37 has a function of subjecting the front side and the back side of a recording medium, such as a sheet, to printing. The network interface 38 is coupled to an external computer 10, and the like, by way of the communication line 20 and can establish mutual data communication.

(Print Control)

Figure 2:
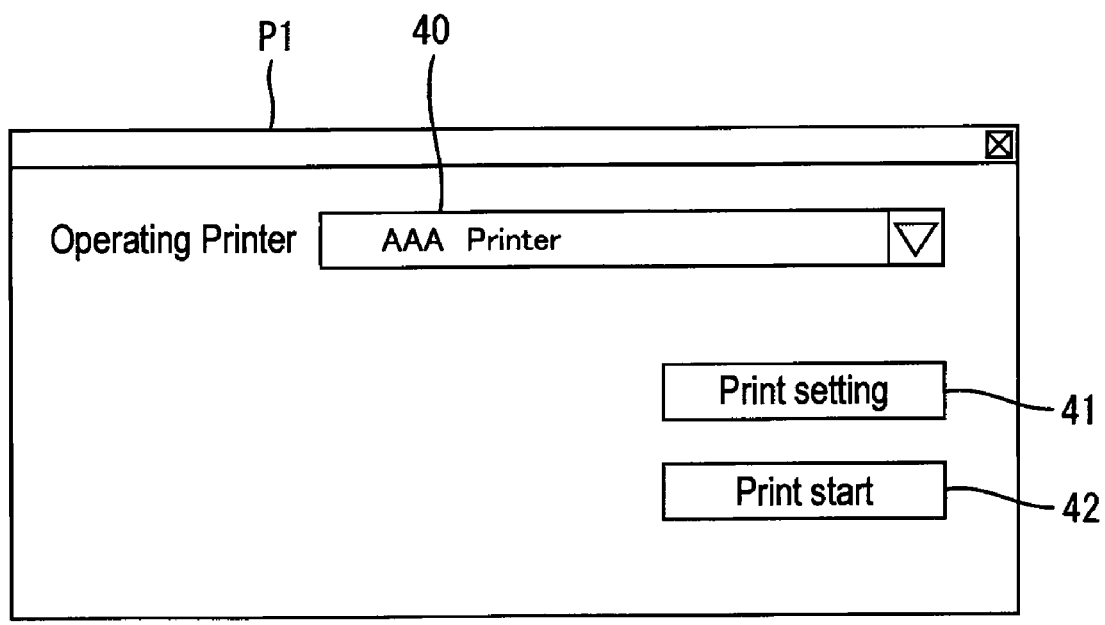
FIG. 2 is a view showing an example of a print command screen.
Figure 3:
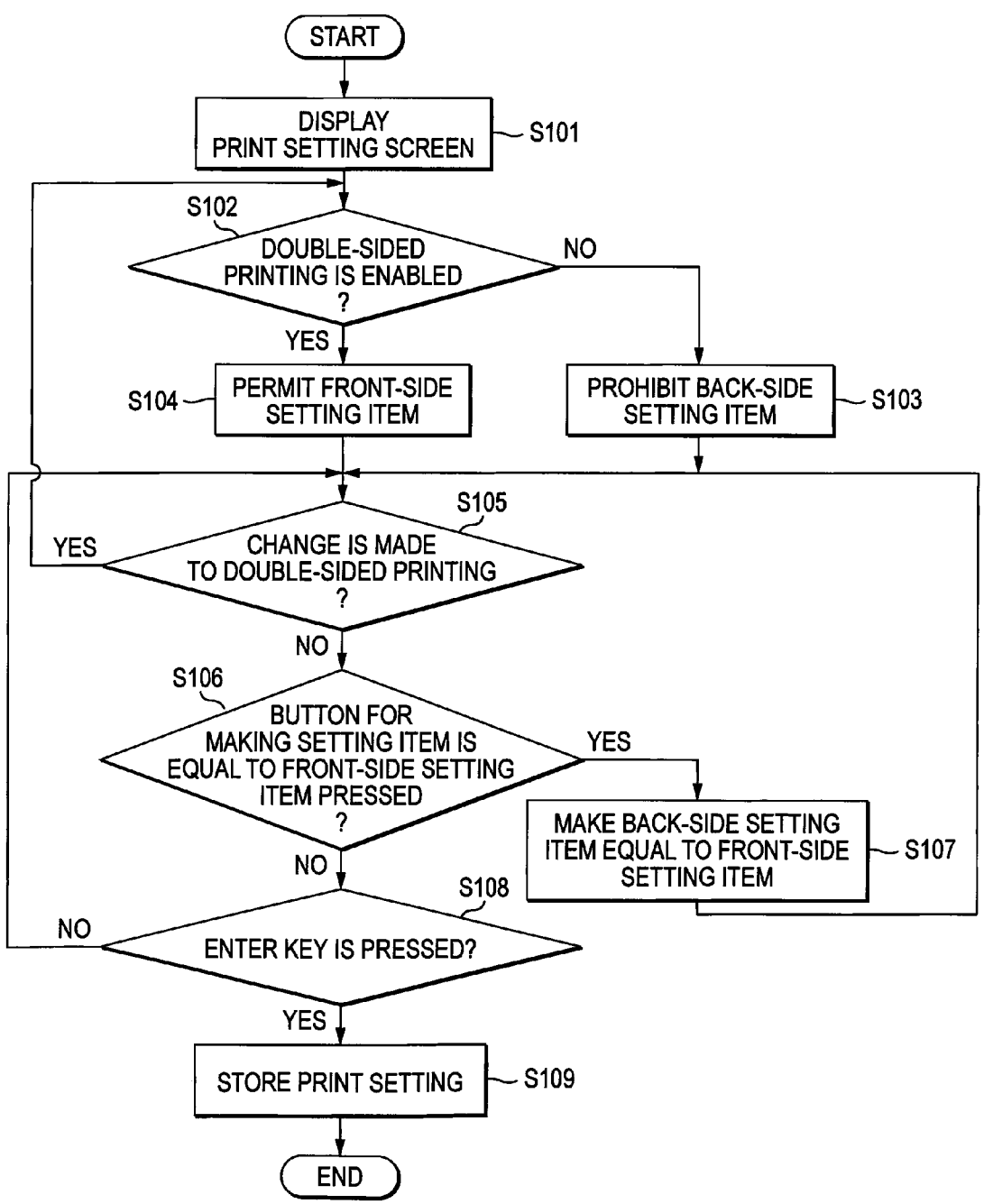
FIG. 3 is a flowchart showing an example of print setting processing.
Figure 4:
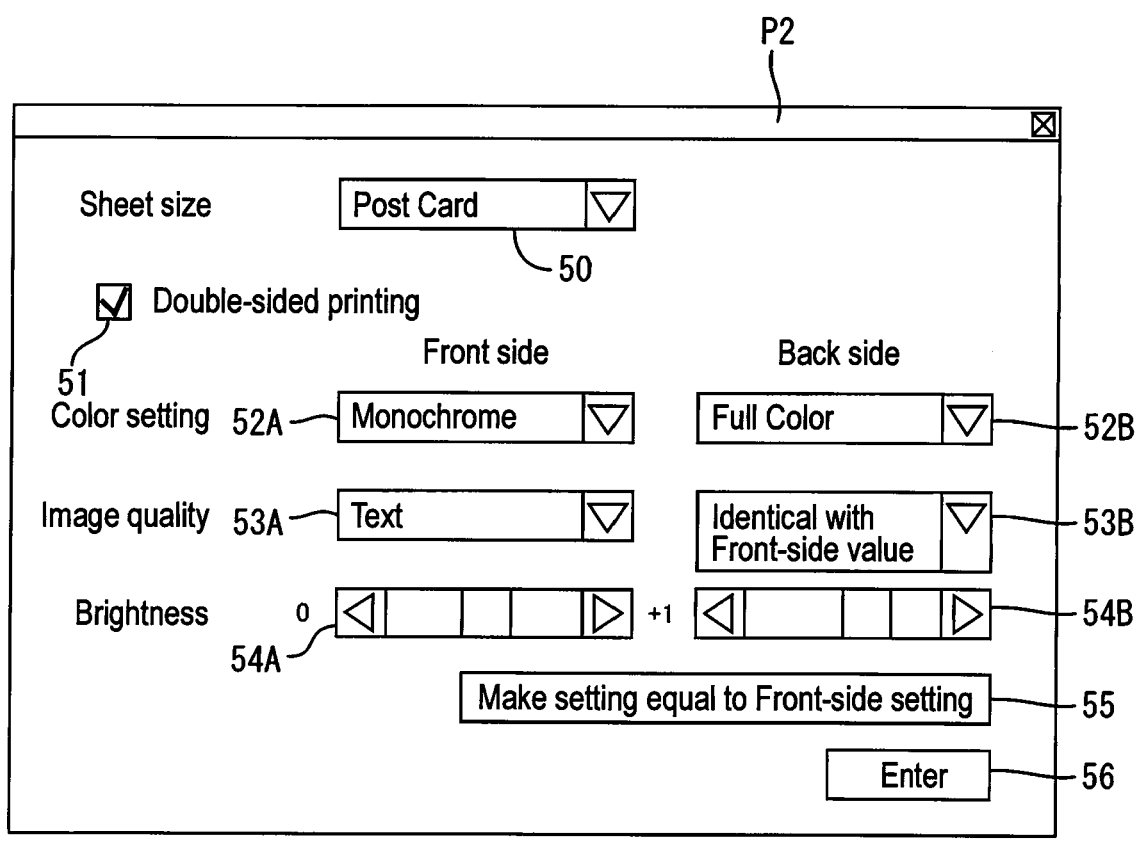
FIGS. 4 and 5 are views showing examples of a print setting screen.
Figure 5:
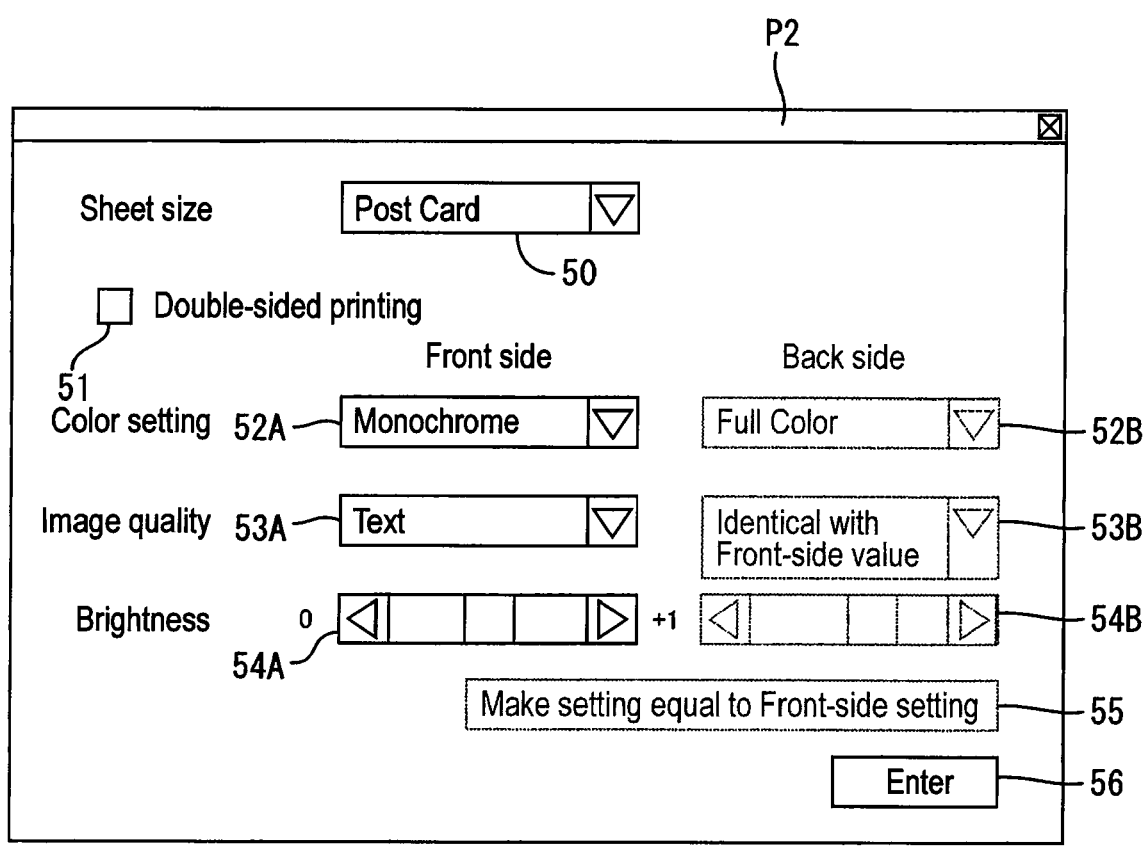
Figure 6:
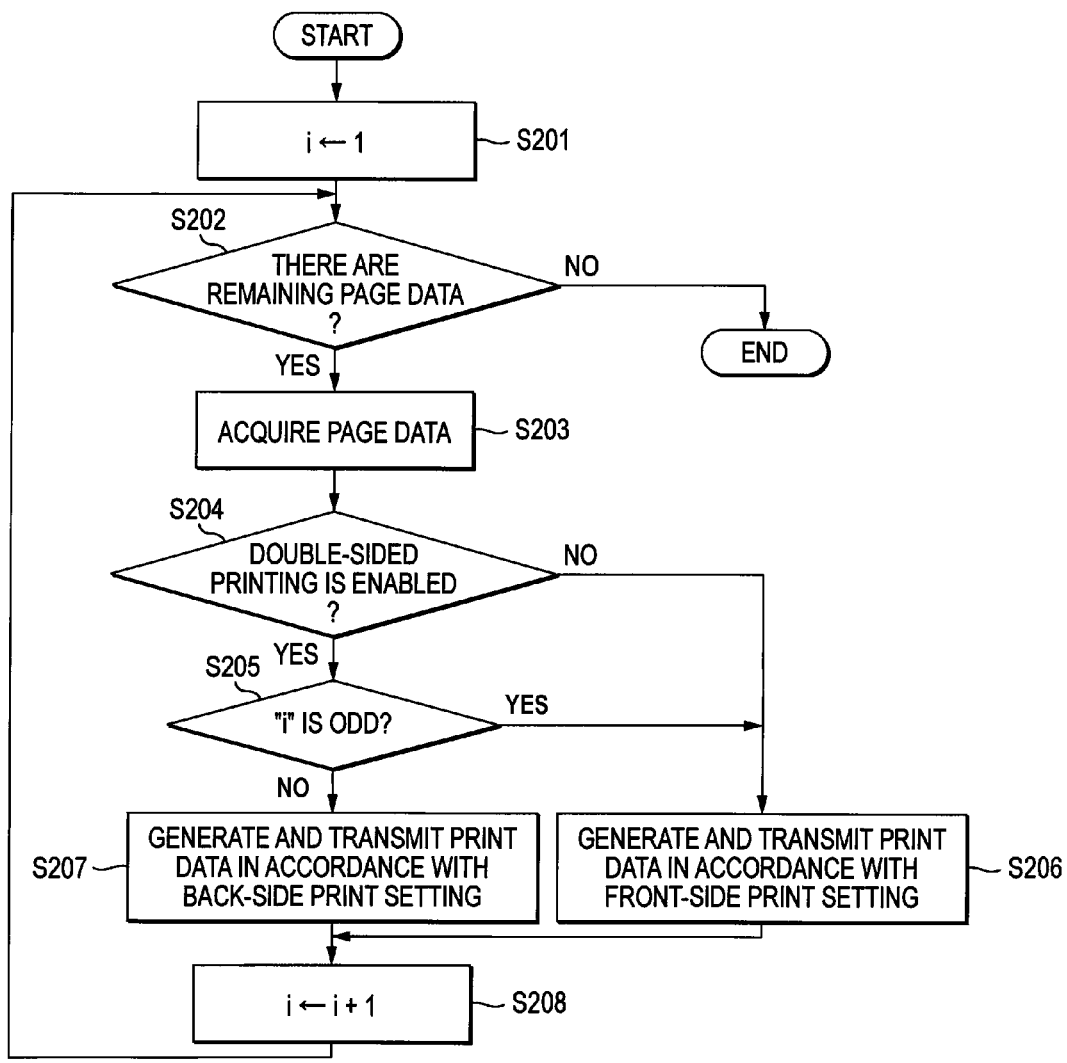
FIG. 6 is a flowchart showing an example of print processing.

Operations performed when the printer 30 performs printing under control of the computer 10 will now be described. FIG. 2 is a view showing an example of a print command screen P1, and FIG. 3 is a flowchart showing an example of print setting processing. FIGS. 4 and 5 are views showing examples of a print setting screen P2, and FIG. 6 is a flowchart showing an example of print processing.

When a print command is input in application software that handles an original, an image, and the like, by way of the operation section 15 of the computer 10, the CPU 11 causes the display section 16 to display; for instance, a print command screen P1, such as that shown in FIG. 2. The print command screen P1 has a printer selection section 40 for selecting a printer to be used, a print setting button 41, and a print start button 42. The printer selection section 40 displays a list of names of printers compatible with printer drivers installed in the computer 10 and permits the selection of one of the printers as a working printer.

When the print setting button 41 is activated using the operation section 15 of the computer 10, the CPU 11 starts a printer driver corresponding to the printer selected by the printer selection section 40, thereby performing print setting processing corresponding to the printer driver corresponding to the selected working printer. When the printer driver according to an exemplary embodiment of the present invention is started, the CPU 11 performs the print setting processing described in FIG. 3.

The CPU 11 first, for instance, displays a print setting screen P2, such as that shown in FIG. 4, on the display section 16 (S101). The print setting screen P2 has fields for designating values of various setting items included in print conditions, such as a sheet size designation section 50, a double-sided print designation section 51, color designation sections 52A and 52B, image quality designation sections 53A and 53B, brightness designation sections 54A and 54B, and the like. Further, the print setting screen P2 is provided with a global command button 55 and an ENTER button 56.

The printer driver includes, as setting items of print conditions, independent setting items that enable setting of different values for the front side and the back side when double-sided printing is performed. In the first exemplary embodiment, items pertaining to a color (e.g., a number of colors), image quality (e.g., a resolution), and brightness (e.g., a color adjustment) are available as independent setting items. Each of the color designation sections 52A and 52B, the image quality designation sections 53A and 53B, and the brightness designation sections 54A and 54B for designating values of the respective independent setting items is divided into a first field (indicated by a symbol A) for designating a set value used for printing the front side and a second field (indicated by a symbol B) for designating a set value used for printing the back side.

The printer driver includes, as setting items of the print conditions, common setting items that enable setting of a single value for the front side and the back side at all times when double-sided printing is performed. In the first exemplary embodiment, the common setting items include items pertaining to a sheet size and items pertaining to double-sided printing. The sheet size designation section 50 for designating a sheet size is not divided into a front-side size and a back-side size; hence, a value common to both the front side and the back side can be globally designated. The double-sided print designation section 51 can designate whether to enable or disable double-sided printing (i.e., whether to perform double-sided printing or single-sided printing).

The configuration of the print setting screen and the setting items of the print conditions are examples and can be changed as needed. In addition, for instance, items pertaining to an enlargement/reduction ratio, integrated printing, a watermark, and others, may also be provided as independent setting items. In addition, items pertaining to, for instance, trays (e.g., a sheet feed tray and a sheet exit tray) used for stacking sheets in the printer 30, the number of prints, and confidential printing (e.g., secure printing), and the like, may also be provided as the common setting items.

In the color designation section 52B and the image quality designation section 53B for designating values of back-side independent setting items, it is possible to select a command (displayed as "identical with a front-side value") for holding a value equal to a corresponding value of the front-side independent setting item (a value of the color designation section 52A and a value of the image quality designation section 53A, respectively) in place of the set value. Specifically, for instance, when the value of the front-side image quality designation section 53A is "text" and when "identical with a front-side value" is designated on the back-side image quality designation section 53B, a setting identical with the setting achieved at the time of designation of "text" is set. When the value of the front-side image quality designation section 53A is changed to "photo" from text, a setting identical with the setting achieved at the time of designation of "photo" is set, without making a change to the value in the back-side image quality designation section 53B.

After displaying the print setting screen P2 in S101 of FIG. 3, the CPU 11 determines whether or not double-sided printing is enabled in the double-sided print designation section 51 (S102). If it is determined that double-sided printing remains disabled (No in S102), inputs pertaining to the respective back-side independent setting items are prohibited (S103) and processing continues to S105. As shown in FIG. 5, the color designation section 52B, the image quality designation section 53B, the brightness designation section 54B, and the global command button 55 are displayed in a grayed out state. The CPU 11 enters a state of not accepting inputs to the designation sections 52B, 53B, and 54B and the global command button 55 from the operation section 15. Therefore, in a state where double-sided printing is disabled, values may be designated solely for front-side items among the independent setting items.

On the other hand, if it is determined that double-sided printing is enabled (Yes in S102), inputs pertaining to the respective back-side independent setting items are permitted in S102 (S104). Thereby, all of the color designation sections 52A and 52B, the image quality designation sections 53A and 53B, and the brightness designation sections 54A and 54B exit from the grayed out state, so that designation inputs may be input for the independent setting items pertaining to both the front side and the back side from the operation section 15.

It is then determined whether or not a change has been made to a value of the double-sided print designation section 15 in S105. If it is determine that a change is made to the value of the double-sided print designation section 15 (Yes in S105), processing returns to S102, where the input pertaining to the respective back-side independent setting item is switched between an input-permitted state and an input-prohibited state, in accordance with the nature of the changed value.

If it is determined that a change has not been made to a value of the double-sided print designation section 15 (No in S105), it is then determined whether the button for making a setting item equal to the front-side setting item is pressed in S106. If it is determined that the global command button 55 is clicked (Yes in S106), values of the plurality of back-side independent setting items are globally made equal to corresponding values of front-side independent setting items (S107), and processing returns to S105. Specifically, when the global command button 55 is clicked while the front-side value of the color designation section 52A is set to "monochrome," the value of the front-side image quality designation section 53A is set to "text," the value of the back-side color designation section 52B is set to "full color," and the value of the back-side image quality designation section 53B is set to "a value equal to a front-side value," the value of the back-side color designation section 52B is changed to "monochrome" along with a display, and the value of the image quality designation section 53B is changed to "text." There may also be adopted a configuration in which, when the global command button 55 is clicked, a plurality of back-side independent setting items assume "values equal to front-side values."

If it is determined that the global command button 55 is not clicked (No in S106), then it is determined whether the ENTER button 56 is pressed at S108. If it is determined that the ENTER button 56 is not clicked (No in S108), the process returns to S105. On the other hand, if it is determined that the ENTER button 56 is clicked (Yes in S108), the values designated in connection with the respective designation sections 50 to 54 are stored as set values of print conditions in the RAM 13 (S109), and the process ends. Thus, the CPU 11 completes print setting processing performed by the printer driver, and closes the print setting screen P2 of the display section 16. When the print start button 42 is activated on the print command screen P1, the CPU 11 starts print processing shown in FIG. 6 using the printer driver selected by the printer selection section 40.

The CPU 11 first sets to one a parameter "i" showing the number of print pages (S201). A determination is made as to whether or not unprinted pages are included in page data pertaining to a print target prepared by application software (S202). If it is determined that the unprinted pages are not included (No in S202), the processing ends. If it is determined that the unprinted pages are included (Yes in S202), page data pertaining to one page are acquired from the application software (S203).

Subsequently, a determination is made whether double sided printing is enabled at S204. If it is determined that a setting of double-sided printing is enabled (Yes in S204), a determination is made whether the value of the parameter "i" is odd in S205. If it is determined that the double sided printing is not enabled (No in S204) or if it is determined that the number of print pages "i" is odd (Yes in S205), print data are generated in the RAM 13 in accordance with the set front-side print conditions, and the print data are transmitted to the printer 30 by way of the network interface 17 (S206). The thus-generated print data are data that are prepared by converting page data pertaining to a print target into, for instance, a printer description language (PDL) format, and that include setting information about print conditions as well as image data.

If it is determined that double-sided printing is set in an enabled state (Yes in S204) and that the number of print pages "i" is even (No in S205), print data are generated from the set back-side print conditions, and the print data are transmitted to the printer 30 (S207). After having transmitted the print data in S206 or S207, the CPU 11 increments the number of print pages "i" by one and returns to S202, where the processing is iterated. Thereby, when double-sided printing is designated, front-side print data based on the front-side print settings and back-side print data based on the back-side print settings are alternately transmitted. In S202, if it is determined that print data are generated or transmitted in connection with page data pertaining to all print targets (No in S202), the CPU 11 completes print processing performed by the printer driver.

Accordingly, when the printer 30 receives the print data transmitted from the computer 10 by way of the network interface 38, the print data are subjected to bitmap expansion under control of the CPU 31 of the printer 30, and the thus-expanded data are sent to the print section 37, where printing is performed. At this time, printing operation is performed in accordance with the setting information about print conditions included in the print data. When double-sided printing is set, printing is performed in accordance with the print conditions set respectively for the front side and the back side of the sheet.

In the print system according to the first exemplary embodiment of the present invention, the print conditions include independent setting items that enable setting of different set values for the front side and the back side. Printing can be carried out in accordance with print conditions set respectively for the front side and the back side; hence, convenience is enhanced. Moreover, when compared with a case where printing is separately carried out while the print conditions are changed for each side, operation can be more simply performed.

For instance, when a color image is desired to be printed on the front side of a sheet and when a monochrome (black) image is desired to be printed on the back side, a related art printer subjects both the front side and the back side to double-sided printing with color settings. However, when printing is performed in this way, processing involves consumption of much time and/or an excessive amount of color ink as compared with a case where the back side is subjected to printing with monochrome settings; hence, cost increases. Since print conditions appropriate respectively for the print contents of the front side and print contents of the back side can be set, a processing time can be shortened and cost may be curtailed.

At the time of processing for setting print conditions, it is possible to input a command for holding set values of the independent setting items for the back side (the color designation section 52B and the image quality designation section 53B) equal to corresponding set values of the independent setting items for the front side. When the set values of the independent setting items for the front side and the set values of the independent setting items for the back side are matched to each other, the set values for one side synchronously becomes equal to the set values for the other side by inputting the command. Therefore, it becomes unnecessary to be aware of the set values for one side, and operation for setting print conditions becomes facilitated.

It is also possible to issue a global command for globally making set values of the plurality of independent setting items pertaining to the back side (the color designation sections 52B, the image quality designation section 53B, and the brightness designation section 54B) equal to corresponding set values of the front side. Hence, the set values of both front and back sides can be more simply made equal to each other.

When performance of single-sided printing is selected as the print conditions, inputs pertaining to set values of independent setting items pertaining to the back side that is not subjected to processing (the color designation section 52B, the image quality designation section 53B, and the brightness designation section 54B) are not accepted. Accordingly, an opportunity for mistake, which would otherwise be caused during setting operation, can be prevented.

Set values of the independent setting items for the front side and set values of the independent setting items for the back side are displayed on a single screen; namely, the print setting screen P2. Therefore, it is easier to ascertain a setting status by comparing both the setting values with each other.

Further, it is possible to globally input set values of the common setting items that assume the same values for both the front side and the back side (the sheet size designation section 50 and the double-sided print designation section 51). Hence, as compared with the case where the set values are separately input, setting operation becomes facilitated.

Items that would cause problems when assuming different set values for the front side and the back side, such as the size of a recording medium like a sheet, a tray, the number of prints, and confidential printing, are taken as common setting items, thereby preventing occurrence of inconvenience, which would otherwise be caused by discrepancy between the set values for the front side and the set values for the back side.

Items, such as the number of colors, a resolution, color adjustment, enlargement and reduction ratios, integrated printing, and a watermark, are taken as independent setting items, thereby making it possible to set different values for the front side and the back side. As a result, printing can be performed under conditions appropriate respectively for print contents of the front side and print contents of the back side.

(Modification of First Exemplary Embodiment)

Figure 7:
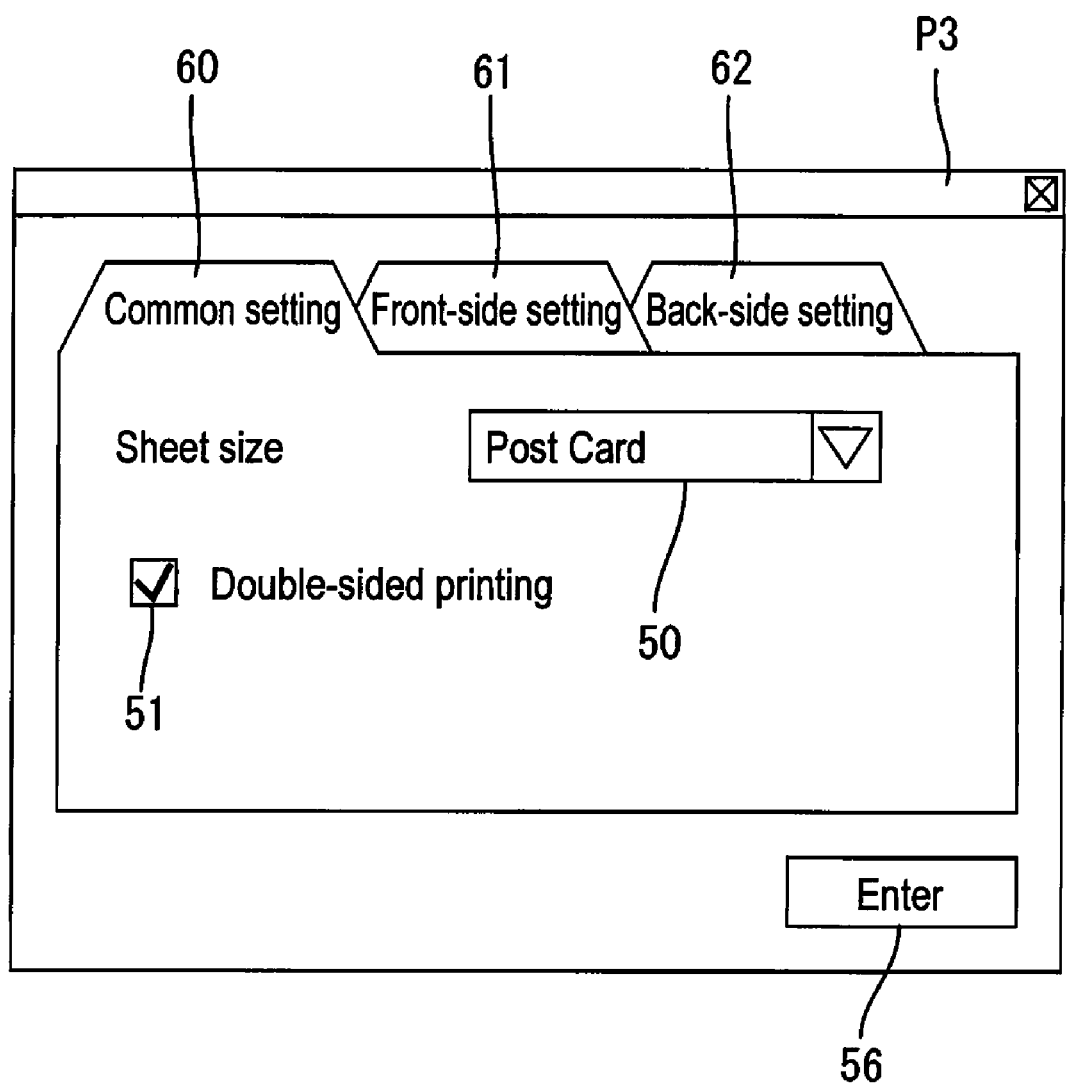
FIGS. 7 to 9 are views showing an example of a print setting screen according to a modification of the first exemplary embodiment.
Figure 8:
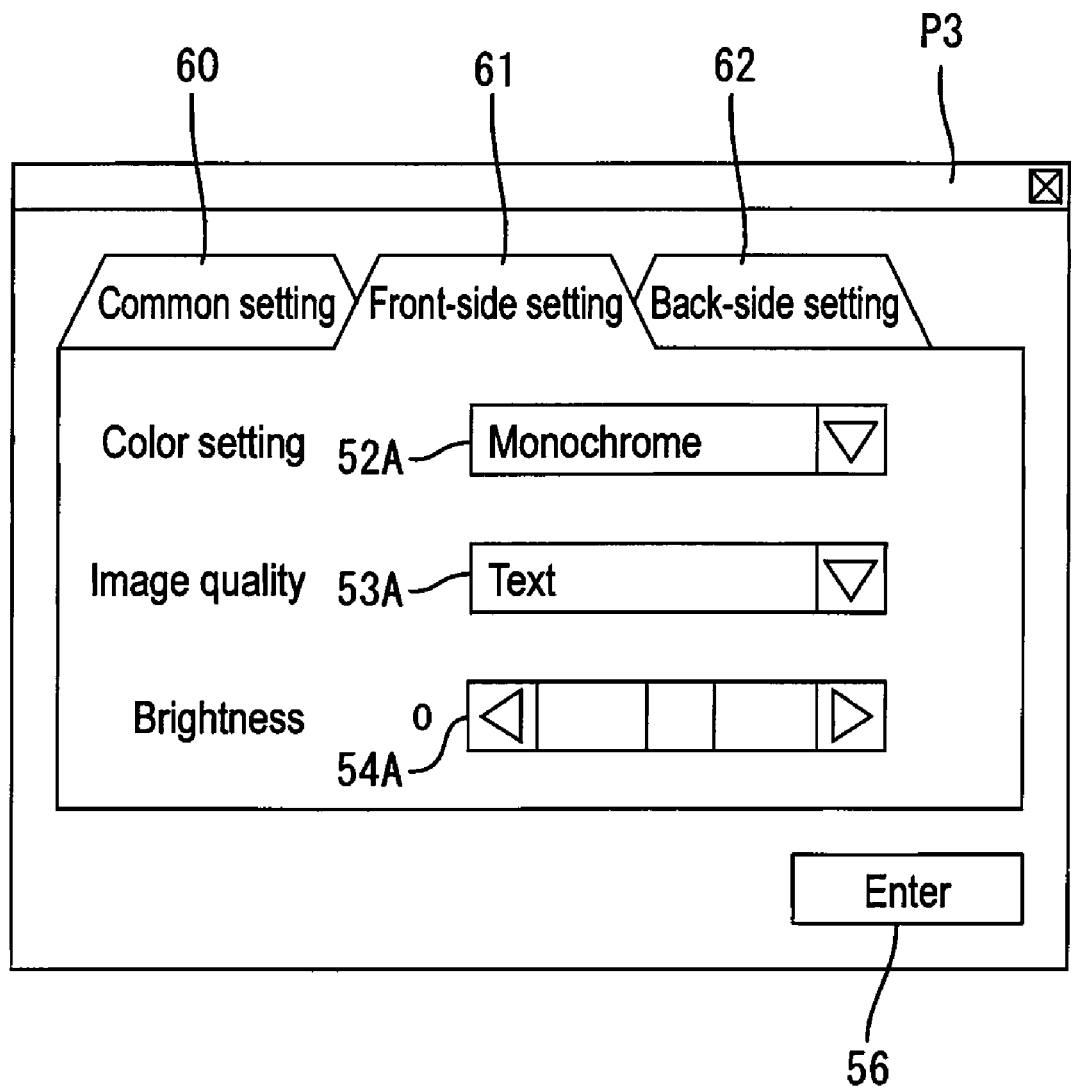
Figure 9:
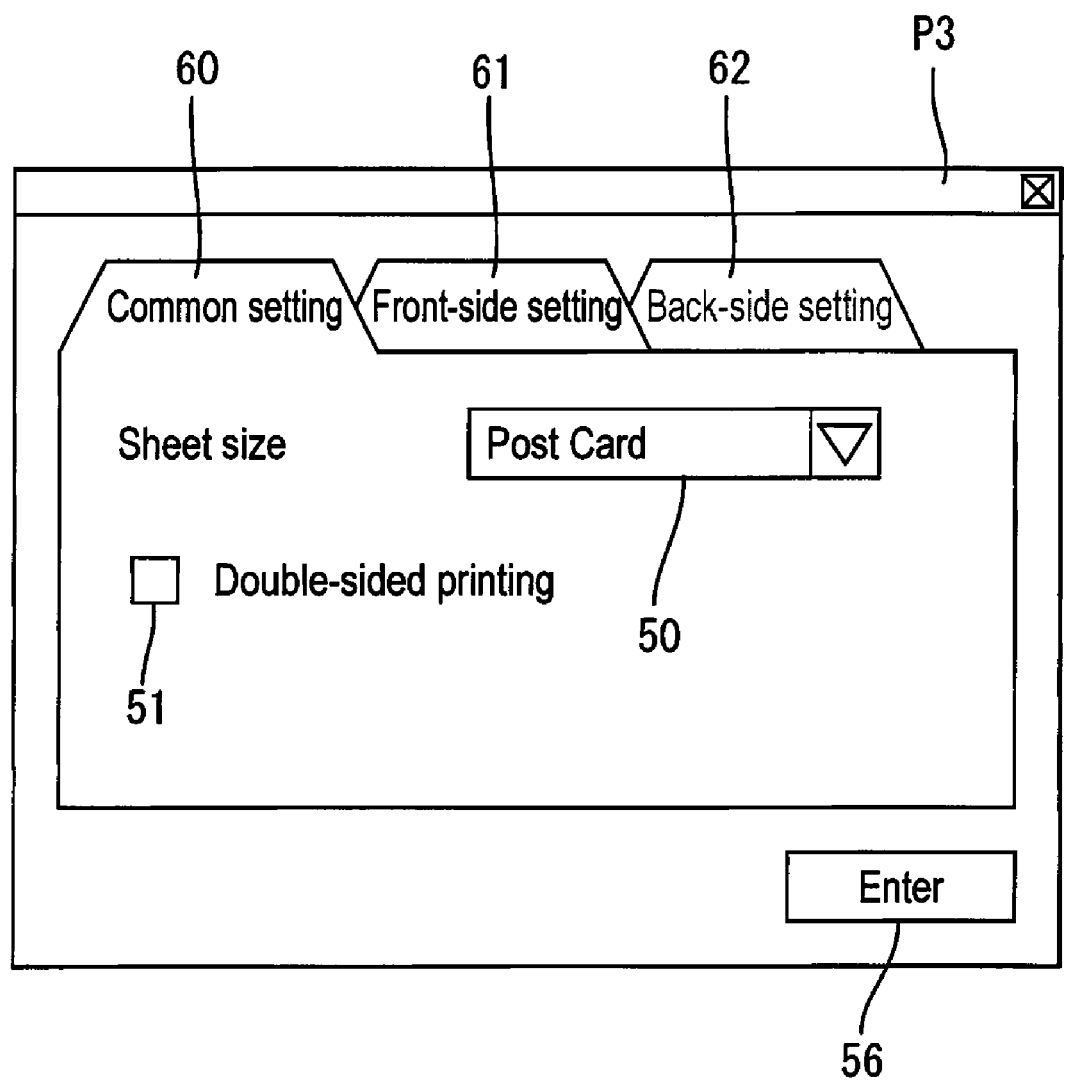

In print setting processing, the print setting screen displayed on the display section 16 can also be configured as shown in FIGS. 7 through 9. A print setting screen P3 has three tabs 60 to 62 (display screens), and the CPU 11 displays one of the tabs by switching the three tabs 60 to 62 pursuant to a command from the operation section 15.

The tab 60 is provided with designation sections for setting the common setting items (e.g., the sheet size designation section 50 and the double-sided print designation section 51); the tab 61 is provided with designation sections for setting the front-side independent setting items (the color designation section 52A, the image quality designation section 53A, the brightness designation section 54A, and the like); and the tab 62 is provided with the back-side independent setting items (the color designation section 52B, the image quality designation section 53B, and the brightness designation section 54B). When double-sided printing is disabled as shown in FIG. 9, the tab 62 is displayed as grayed out and in a state of not accepting inputs for the back-side independent setting items (the color designation section 52B, the image quality designation section 53B, and the brightness designation section 54B) from the operation section 15.

As mentioned above, according to the modification of the first exemplary embodiment, the common setting items are displayed on a screen differing from the screen on which the front-side and back-side independent setting items are displayed. Therefore, it is easier to grasp the common setting items as items whose functions differ from functions of the independent setting items.

Second Exemplary Embodiment

Figure 10:
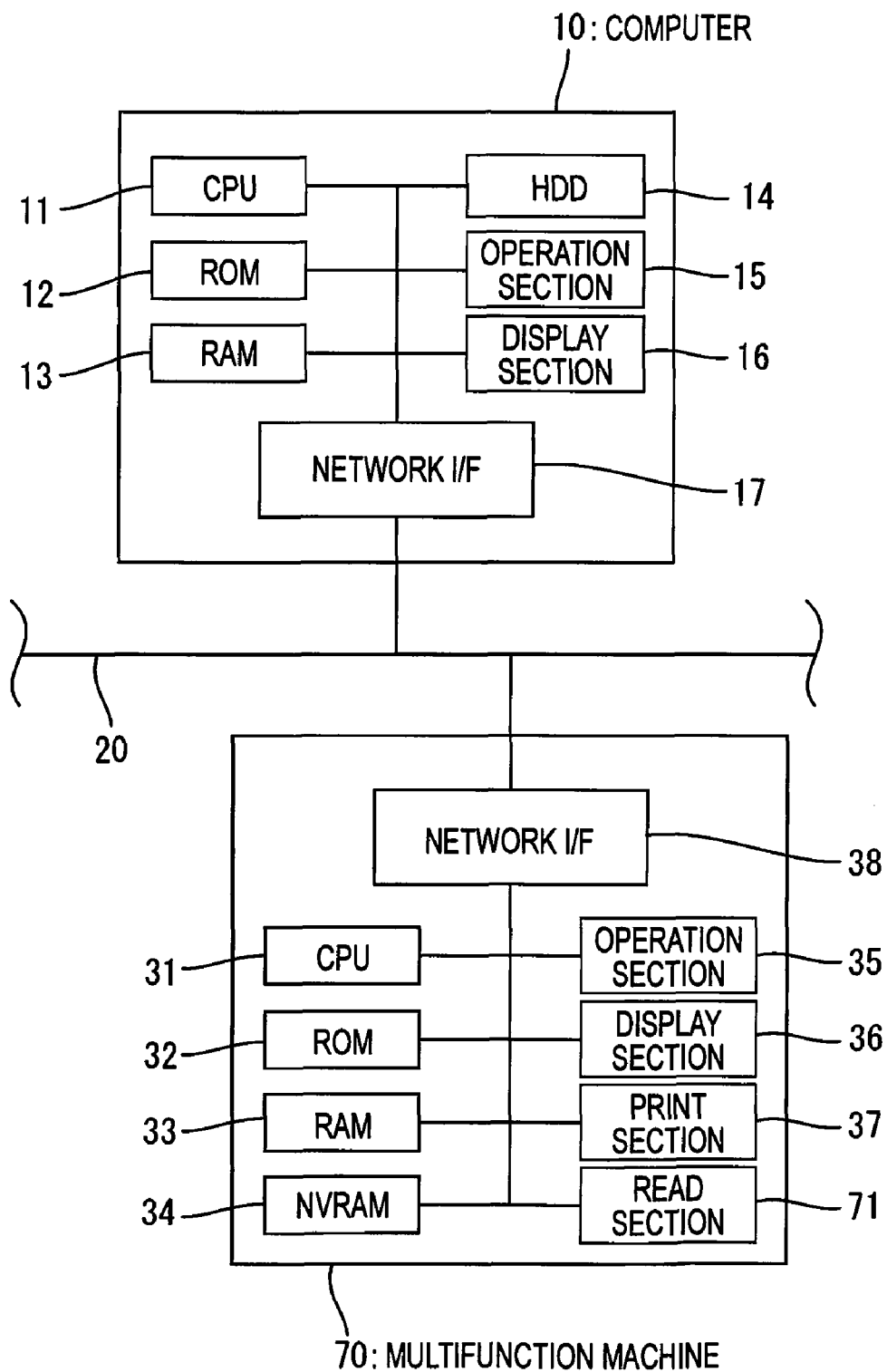
FIG. 10 is a block diagram showing an example of an electrical configuration of a reading system according to a second exemplary embodiment of the present invention.
Figure 11:
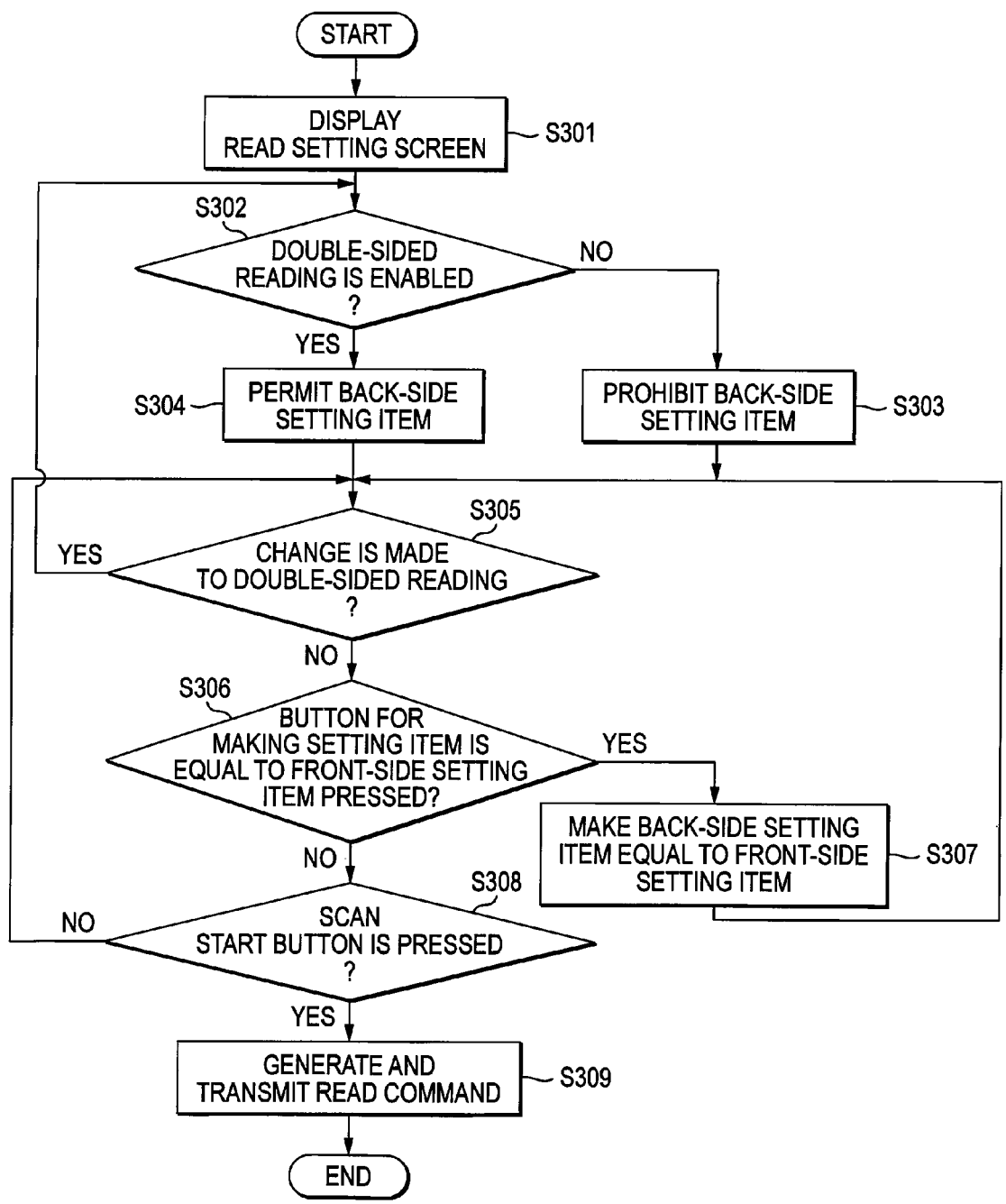
FIG. 11 is a flowchart showing an example of read setting processing.
Figure 12:
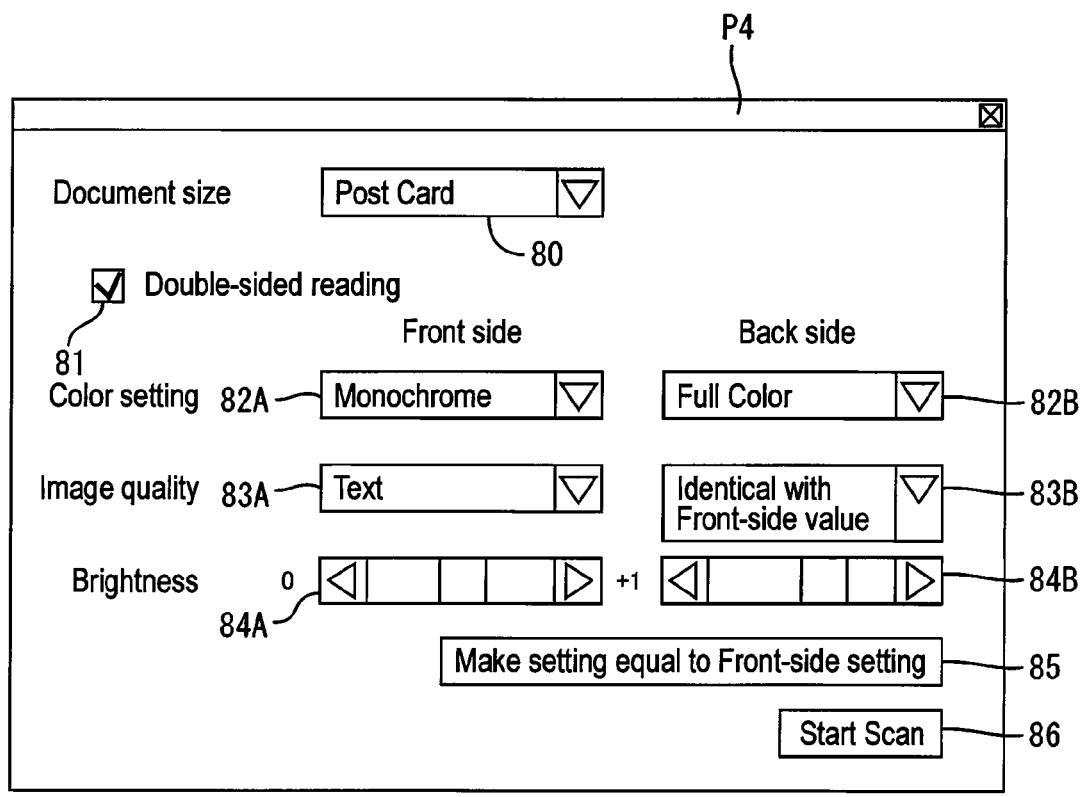
FIG. 12 is a view showing an example of a read setting screen.
Figure 13:
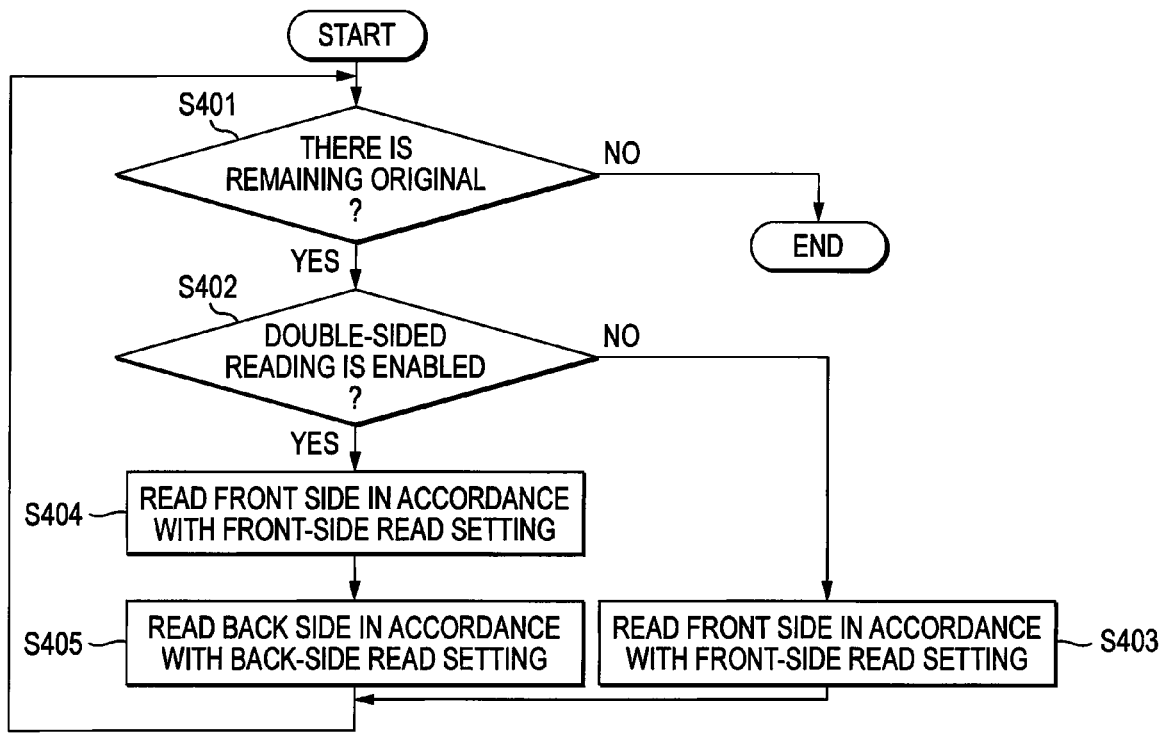
FIG. 13 is a flowchart showing an example of read processing.

A second exemplary embodiment of the present invention will now be described by reference to FIGS. 10 to 12. FIG. 10 is a block diagram showing an example of an electrical configuration of a reading system having the computer 10 and a multifunction machine 70. FIG. 11 is a flowchart showing an example of read setting processing; FIG. 12 is a view showing an example of a read setting screen; and FIG. 13 is a flowchart showing read processing.

The multifunction machine 70 is realized by addition of a read section 71 to the printer 30 of the first exemplary embodiment and is analogous to the printer of the first exemplary embodiment, in other respects, in terms of a configuration. Configurational elements identical with those of the first exemplary embodiment are assigned the same reference numerals, and their explanations are omitted. A read section 71 has a tray (not shown) that enables inputting of a plurality of originals; conveys the originals set on the tray one at a time; and reads the originals, to thus acquire image data pertaining to the respective originals. The read section 71 can perform an operation for reading only the front side of an original and an operation for reading both the front side and the back side of an original. At the time of a double-sided reading operation, the original is read in sequence of the front side and the back side.

Application software compatible with TWAIN and a scanner driver for causing the printer 30 to perform network scan are stored in the hard disk drive 14 of the computer 10. An original is set on the read section 71 of the multifunction machine 70 and a command for invoking the scanner driver is input by way of the operation section 15 and by means of TWAIN-compatible application software executed by the computer 10, whereupon the CPU 11 starts the scanner driver, to thus commence read setting processing shown in FIG. 11.

The CPU 11 first displays a read setting screen P4, such as that shown in FIG. 12, on the display section 16 (S301). The read setting screen P4 has fields for designating values to be set on various setting items included in read conditions, such as a document size designation section 80, a double-sided read designation section 81, color designation sections 82A and 82B, image quality designation sections 83A and 83B, and brightness designation sections 84A and 84B. The read setting screen P4 is additionally provided with a global command button 85 and a read start button 86.

In the scanner driver, the read conditions include independent setting items that enable setting of different values for the front side and the back side when double-sided reading is performed and common setting items that enable setting of the same values for the front side and the back side at all times. In the second exemplary embodiment, items pertaining to colors (e.g., a number of colors), image quality (e.g., a resolution), and brightness (e.g., a color adjustment) are available as independent setting items. Each of the color designation sections 82A and 82B, the image quality designation sections 83A and 83B, and the brightness designation sections 84A and 84B corresponding to the respective items is divided into a front-side field and a back-side field.

In the second exemplary embodiment, items pertaining to an original size and items pertaining to double-sided reading are available as common setting items. The original size designation section 80 for setting an original size is not divided into a front-side designation section and a back-side designation section, and hence a value common to both the front side and the back side can be globally designated. Further, the double-sided read designation section 81 can designate whether to enable or disable double-sided reading (whether to perform double-sided reading or single-sided reading).

After displaying the read setting screen P4 in S301 of FIG. 11, the CPU 11 determines whether or not double-sided reading is enabled in the double-sided reading designation section 81 (S302). If it is determined that double-sided reading is disabled (No in S302), inputs pertaining to the respective back-side independent setting items are prohibited (S303), and processing proceeds to S305. The color designation section 82B, the image quality designation section 83B, the brightness designation section 84B, and the global command button 85 are displayed in a grayed out state at this time, and the CPU 11 is in a state of not accepting inputs for these designation sections 82B, 83B, and 84B and the global command button 85 from the operation section 15.

On the other hand, if it is determined that double-sided reading is enabled (Yes in S302), inputs for the respective back-side independent setting items are permitted (S304).

It is then determined whether a change is made to double sided reading in S305. If it is determined that a change is made to the value of the double-sided reading designation section 81 (Yes in S305), processing returns to S302, and inputs for the respective back-side independent setting items are switched between an input-permitted state and an input-prohibited state in accordance with the nature of the changed value. If it is determined that a change is not made to the value of the double-sided reading designation section 81 (No in S305), it is determined whether the button for making a setting item equal to a front-side setting item is pressed in S306. If it is determined that the global command button 85 is clicked (Yes in S306), values of the respective back-side independent setting items are globally made equal to values for corresponding front-side independent setting items (S307), and processing returns to S305.

A determination is then made whether a scan start button is pressed in S308. If it is determined that the scan start button 86 is clicked (Yes in S308), the CPU 11 generates a read command including the values designated by the respective designation sections 80 to 84B as set information, and the read command is transmitted to the multifunction machine 70 by way of the network interface 17 (S309), and read setting processing is completed. If it is determined that the scan start button 86 is not clicked (No in S308), the process returns to S305.

Upon receipt of the read command by way of the network interface 38, the multifunction machine 70 starts read processing shown in FIG. 13 under control of the CPU 31. The CPU 31 first determines whether or not originals are present on the tray of the read section 71 (S401). If it is determined that no originals are present on the tray (No in S401), the process ends. On the other hand, if it is determined that originals are present (Yes in S401), a determination is made as to whether or not double-sided reading in the read command is set in an enabled position (S402).

If it is determined that double-sided reading is disabled (No in S402), only the front side of an original is read in accordance with front-side read conditions included in the read command (S403), and acquired image data are transmitted to the computer 10 by way of the network interface 38. On the other hand, if it is determined that double-sided reading is enabled (Yes in S402), the front side of the original is first read in accordance with settings of the front-side read conditions included in the read command (S404). Subsequently, the back side of the original is read in accordance with the setting of the back-side read conditions (S405), and the thus-acquired image data are sequentially transmitted to the computer 10.

After reading has been performed in S403 or S405, processing returns to S401, and similar processing is iterated until originals on the tray become empty. When the originals on the tray have become empty (No in S401), reading processing is completed.

In the computer 10, the CPU 11 waits for receiving image data after completion of read setting processing. When image data are received, contents of the image data are displayed by means of the TWAIN-compatible application software.

As mentioned above, according to the second exemplary embodiment, the read conditions include independent setting items that enable setting of different set values for the front side and the back side. Since reading can be performed in accordance with the read conditions set respectively for the front side and the back side, convenience is enhanced. Moreover, when compared with the case where reading is separately performed by changing read conditions for each side, operation can be readily performed.

Other Exemplary Embodiment

The present invention is not limited to the exemplary embodiments described. For instance, exemplary embodiments, such as those provided below, also fall within the technical scope of the present invention, and are included in the appended claims.

For example, in the exemplary embodiments described above, a system that performs printing and reading by way of a network is provided. However, the present inventive concept can also be applied to a single printer or a single reader. Specifically, in, for instance, the printer (multifunction machine) 70 shown in FIG. 10, when data acquired as a result of the read section 71 reading an original are printed or when data read from an external storage medium, such as USB memory, are printed, print conditions may be designated for the front side and the back side by use of the operation section 35 and the display section 36 under control of the CPU 31, thereby performing double-sided printing in accordance with the thus-set print conditions. Likewise, under control of the CPU 31, the reading device (the multifunction machine) 70 of FIG. 10 may also allow designation of read conditions for the front side and the back side by use of the operation section 35 and the display section 36, to thus perform double-sided reading in accordance with the thus-set read conditions.

What is claimed is:

1. An image processing system comprising:
an operation unit configured to receive commands;
a processing unit which performs setting processing for setting, in accordance with the commands received by the operation unit, a performance condition comprising an independent setting item, the independent setting item comprising a front side field and a back side field for setting different values, respectively, for the front side and the back side of a sheet material; and
a performance unit which prints or reads the front side and the back side of the sheet material in accordance with the performance condition set by the processing unit,
wherein the processing unit receives, at the time of setting processing, a setting command of the independent setting item in the back side field, based on a command received by the operation unit, the setting command in the back side field indicating that a setting value of the back side is set to be equal to the setting value of the front side for the independent setting item such that when the setting value of the front side is changed and the setting command is set in the back side field, the setting value of the back side changes to the setting value of the front side.

2. The image processing system according to claim 1, wherein the operation unit comprises a keyboard and a mouse.

3. The image processing system according to claim 1, wherein the performance unit performs printing, and
the independent setting item comprises at least one of a number of colors, a resolution, a color adjustment, an enlargement/reduction ratio, an integrated printing, and a watermark.

4. The image processing system according claim 1, wherein the performance condition comprises a plurality of independent setting items; and
the operation unit receives a global command and sends the global command to the processing unit for globally setting the front side field of each one of the plurality of independent setting items equal to the corresponding back side field of the independent setting item.

5. The image processing system according to claim 1, wherein the performance unit performs double-sided processing for processing both sides of the sheet material or single-sided processing for processing only one side of the sheet material;
the operation unit is configured to receive a command for performing either double-sided processing or single-sided processing; and
the processing unit sets the performance condition for both the front and back sides at the time of setting processing when the command indicates that double-sided processing is to be performed, and sets the performance condition for a side to be processed but not for a side not to be processed when the command indicates that single-sided processing is to be performed.

6. The image processing system according to claim 1, further comprising:
a display unit, wherein the processing unit displays on a single screen of the display unit the front side field and the back side field of the independent setting item.

7. The image processing system according to claim 1, wherein the performance condition further comprises a common setting item for setting only a single value for both the front side and the back side; and
the operation unit receives a command for globally setting the single value of the common setting item.

8. The image processing system according to claim 7, wherein the performance unit performs printing, and
the common setting item comprises at least one of a size of the sheet material, a tray on which the sheet material is stacked, a number of prints, and confidential printing.

9. The image processing system according to claim 1, further comprising:
a display unit, wherein
the performance condition comprises a common setting item for setting only a single value for both the front side and the back side;
the operation unit is configured to receive a command for globally setting the single value of the common setting item; and
the processing unit displays a plurality of setting screens, which are switchable according to a command received by the operation unit, on the display unit at a time of the setting processing and displays the common setting item on a setting screen of the plurality of setting screens that differs from the setting screen on which the front side field and the back side field of the independent setting item are displayed.

10. A reading device comprising:
a read unit configured to acquire image data by reading front and back sides of a sheet material;
an operation unit configured to receive a command;
a processing unit configured to:
perform, in accordance with a command received by the operation unit, processing for setting the read condition comprising an independent setting item, the independent setting item comprising a front side field and a back side field for setting different values, respectively, for the front side and the back side of a sheet material;
control the read unit to read the front and back sides of a sheet material in accordance with the read condition set by the processing unit; and
receive, at the time of processing, a setting command of the independent setting item in the back side field, based on a command received by the operation unit, the setting command in the back side field indicating that a setting value of the back side is set to be equal to the setting value of the front side for the independent setting item such that when the setting value of the front side is changed and the setting command is set in the back side field, changing the setting value of the back side to the setting value of the front side.

11. A non-transitory computer readable medium storing a printer driver that, when executed by a processor, configures a printing device, the printer driver comprising:
an acquisition module configured to acquire a value of a print condition comprising an independent setting item that enables independent setting of different values respectively for the front side and the back side of a sheet material; and
a print module configured to generate print data for causing the printing device to perform double-sided printing in accordance with the set value of the print condition,
wherein a setting command of the independent setting item for the back side is received, the setting command indicating that a setting value of the back side is equal to the setting value of the front side, and
when the acquisition module acquires the setting command indicating that the setting value of the back side is equal to the setting value of the front side, the print module uses the setting value of the front side for the setting value of the back side, and
wherein when the setting value of the front side changes and the setting command is set for the back side, the setting value of the back side changes to the setting value of the front side.

12. A non-transitory computer readable medium storing a scanner driver that, when executed by a processor, configures a reading device, the scanner driver comprising:
an acquisition module configured to acquire a value of a read condition comprising an independent setting item including a front side field and a back side field that enables independent setting of different values respectively for the front side and the back side of a sheet material; and
a scan module configured to generate a read command for causing the reading device to read the front side and the back side of the sheet material in accordance with the acquired value of the read condition, wherein a setting command of the independent setting item for the back side is received in the back side field, the setting command indicating that a setting value of the back side is equal to the setting value of the front side,
when the acquisition module acquires the setting command in the back side field indicating that the setting value of the back side is equal to the setting value of the front side for the independent setting item, the scan module uses the setting value of the front side for the setting value of the back side, and
when the setting value of the front side changes and the setting command is set in the back side field, the setting value of the back side changes to the setting value of the front side.

13. A printing device comprising:
a print unit configured to perform double-sided printing on a sheet material;
an operation unit configured to receive commands;
a processing unit configured to:
perform, in accordance with a command received by the operation unit, processing for setting a print condition comprising an independent setting item, the independent setting item comprising a front side field and a back side field for setting different values, respectively, for the front side and the back side of a sheet material; and
control the print unit to perform double-sided printing in accordance with the print condition set by the processing unit,
receive, at the time of processing, a setting command of the independent setting item in the back side field, based on a command received by the operation unit, the setting command indicating that a setting value of the back side is set to be equal to the setting value of the front side for the independent setting item such that when the setting value of the front side is changed and the setting command is set in the back side field, the setting value of the back side changes to the setting value of the front side.

* * * * *